(12) United States Patent
Murakami

(10) Patent No.: US 9,513,685 B2
(45) Date of Patent: Dec. 6, 2016

(54) MEASURING METHOD OF A PROCESSING LOAD OF A PROCESSOR INCLUDING A PLURALITY OF CORES

(71) Applicant: FUJITSU LIMITED, Kawasaki-shi, Kanagawa (JP)

(72) Inventor: Takeo Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 14/304,184

(22) Filed: Jun. 13, 2014

(65) Prior Publication Data

US 2015/0033240 A1   Jan. 29, 2015

(30) Foreign Application Priority Data

Jul. 23, 2013 (JP) ................................ 2013-153073

(51) Int. Cl.
| | |
|---|---|
| G06F 9/46 | (2006.01) |
| G06F 1/32 | (2006.01) |
| G06F 11/34 | (2006.01) |
| G06F 11/30 | (2006.01) |

(52) U.S. Cl.
CPC ......... *G06F 1/3212* (2013.01); *G06F 11/3024* (2013.01); *G06F 11/34* (2013.01); *G06F 11/3419* (2013.01); *G06F 11/3466* (2013.01); *G06F 2201/865* (2013.01); *Y02B 60/165* (2013.01)

(58) Field of Classification Search
None
See application file for complete search history.

(56) References Cited

U.S. PATENT DOCUMENTS

| | | | |
|---|---|---|---|
| 7,111,179 B1* | 9/2006 | Girson | G06F 1/3203 320/130 |
| 2006/0095902 A1 | 5/2006 | Nakaike et al. | |
| 2007/0033425 A1* | 2/2007 | Clark | G06F 1/3203 713/320 |
| 2009/0217277 A1* | 8/2009 | Johnson | G06F 9/3851 718/102 |
| 2009/0328055 A1* | 12/2009 | Bose | G06F 1/3203 718/105 |
| 2012/0036398 A1* | 2/2012 | Moyer | G06F 9/505 714/48 |

(Continued)

FOREIGN PATENT DOCUMENTS

| | | |
|---|---|---|
| JP | 2006-127302 | 5/2006 |
| JP | 2008-204350 | 9/2008 |
| JP | 2013-92874 | 5/2013 |

OTHER PUBLICATIONS

NVIDIA. "Variable SMP—A Multi-Core CPU Architecture for Low Power and High Performance." NVIDIA Whitepaper. N.p., Feb. 15, 2011. Web. Sep. 7, 2015. <http://www.nvidia.com/content/pdf/tegra_white_papers/tegra-whitepaper-0911b.pdf>.*

(Continued)

*Primary Examiner* — Wei Zhen
*Assistant Examiner* — Binh Luu
(74) *Attorney, Agent, or Firm* — Oblon, McClelland, Maier & Neustadt, L.L.P.

(57) ABSTRACT

A method of measuring a processing load of a processor in executing a thread. When the load is above a threshold, measuring repeatedly at a first time interval, and when lower than the threshold, measuring repeatedly at a second, longer time interval.

17 Claims, 16 Drawing Sheets

(56) References Cited

U.S. PATENT DOCUMENTS

2013/0103956 A1    4/2013  Murakami
2013/0268787 A1*  10/2013  Koo .................... G06F 1/3203
                                                  713/322
2013/0346991 A1*  12/2013  Murakami ........... G06F 9/4881
                                                  718/102

OTHER PUBLICATIONS

S Shyam. "Enable or Disable CPU Core Parking in Windows 7." The Windows Club. N.p., Jul. 14, 2012. Web. Sep. 7, 2015. <http://web.archive.org/web/20120716234653/http://www.thewindowsclub.com/enable-disable-core-parking-windows>.*
Brooks, Arik. "Operating System and Process Monitoring Tools." Washington University in St. Louise. N.p., Dec. 12, 2006. Web. Apr. 18, 2016. <http://www.cse.wustl.edu/~jain/cse567-06/ftp/os_monitors/>.*

* cited by examiner

FIG. 3

| PROCESS ID | PROGRAM NAME | TYPE | STATUS |
|---|---|---|---|
| p0 | com.android browser | FOREGROUND | RUNNING |
| p2 | system_server | BACKGROUND | RUNNING |
| ... | ... | ... | ... |

| PROCESS ID (pid) | THREAD ID (tid) |
|---|---|
| p0 | t01,t03 |
| p2 | t20,t25,t26 |

| PROCESS ID (pid) | ACCUMULATED OPERATION TIME | CPU USAGE TIME (delta_time) |
|---|---|---|
| p0 | 4640 | 8 |
|  |  |  |
| p2 | 675 | 10 |

| THREAD ID (tid) | ACCUMULATED OPERATION TIME | CPU USAGE TIME (delta_time) |
|---|---|---|
| t01 | 750 | 5 |
| t03 | 443 | 2 |
| t20 | 466 | 5 |
| t25 | 7 | 2 |
| t26 | 120 | 2 |

| Online<br>(ONLINE CPU CORE NUMBER) | 0 |
|---|---|
| Offline<br>(OFFLINE CPU CORE NUMBER) | 1 |
| run_queue_avg<br>(AVERAGE VALUE OF EXECUTION QUEUE LENGTHS OF THREADS) | 0.78 |
| CPU UTILIZATION RATE (%) | 65 |
| OPERATION FREQUENCY (MHz) | 800 |

| PROCESS ID (pid) | ACCUMULATED OPERATION TIME | CPU USAGE TIME (delta_time) |
|---|---|---|
| p0 | 4758 | 7 |
|  |  |  |
| p2 | 685 | 20 |
|  |  |  |
|  |  |  |

302c

| THREAD ID (tid) | ACCUMULATED OPERATION TIME | CPU USAGE TIME (delta_time) |
|---|---|---|
| t01 | 755 | 4 |
| t03 | 445 | 1 |
| t20 | 471 | 2 |
| t25 | 7 | 2 |
| t26 | 122 | 1 |

| PROCESS ID (pid) | ACCUMULATED OPERATION TIME | CPU USAGE TIME (delta_time) |
|---|---|---|
| p0 | 4758 | 7 |
|  |  |  |
| p2 | 685 | 10 |
|  |  |  |
|  |  |  |

302c

| THREAD ID (tid) | ACCUMULATED OPERATION TIME | CPU USAGE TIME (delta_time) |
|---|---|---|
| t01 | 755 | 4 |
| t03 | 445 | 1 |
| t20 | 471 | 2 |
| t21 | (86) | (2) |
| t22 | (34) | (2) |
| t23 | (9) | (2) |
| t24 | (13) | (5) |
| t25 | 7 | 2 |
| t26 | 122 | 1 |

FIG. 14A

| PROCESS ID (pid) | THREAD ID (tid) |
|---|---|
| p0 | t01,t03 |
| p2 | t20,t25,t26 |

| PROCESS ID (pid) | THREAD ID (tid) |
|---|---|
| p0 | t01,t03 |
| p2 | t20,t21,t22,t23,t24t,25,t26 |

| PROCESS ID (pid) | ACCUMULATED OPERATION TIME | CPU USAGE TIME (delta_time) |
|---|---|---|
| p0 | 4640 | 8 |
| | | |
| p2 | 675 | 10 |
| | | |
| | | |
| | | |
| | | |
| | | |
| | | |

302b

| THREAD ID (tid) | ACCUMULATED OPERATION TIME | CPU USAGE TIME (delta_time) |
|---|---|---|
| t01 | 750 | 5 |
| t03 | 443 | 2 |
| t20 | 466 | 5 |
| t21 | 7 | 1 |
| t22 | 120 | 2 |
| t23 | 443 | 2 |
| t24 | 466 | 5 |
| t25 | 7 | 1 |
| t26 | 120 | 2 |

| PROCESS ID (pid) | ACCUMULATED OPERATION TIME | CPU USAGE TIME (delta_time) |
|---|---|---|
| p0 | 4640 | 8 |
| | | |
| p2 | 675 | 10 |
| | | |

302b

| THREAD ID (tid) | ACCUMULATED OPERATION TIME | CPU USAGE TIME (delta_time) |
|---|---|---|
| t01 | 750 | 5 |
| t03 | 443 | 2 |
| t20 | 466 | 5 |
| t24 | 120 | 4 |

| PROCESS ID (pid) | THREAD ID (tid) |
|---|---|
| p0 | t01,t03 |
| p2 | t20,t21,t22,t23,t24t25,t26 |

| PROCESS ID (pid) | THREAD ID (tid) |
|---|---|
| p0 | t01,t03 |
| p2 | t20,t24t |

302a

MEASURING METHOD OF A PROCESSING LOAD OF A PROCESSOR INCLUDING A PLURALITY OF CORES

CROSS-REFERENCE TO RELATED APPLICATION

This application is based upon and claims the benefit of priority of the prior Japanese Patent Application No. 2013-153073, filed on Jul. 23, 2013, the entire contents of which are incorporated herein by reference.

FIELD

The embodiments discussed herein are related to a measuring method, a non-transitory computer-readable storage medium, and an information processing apparatus.

BACKGROUND

With a trend towards higher performance and multiple functional portable information terminals, power consumption of portable information terminals tends to increase. However, there is a limit to electric power supplied from batteries mounted on portable information terminals. In response to this, a portable information terminal in recent years mounts a multi-core CPU with built-in multiple cores and dynamically increases or decreases the number of operating cores while observing a CPU load to reduce power consumption of the entire CPU while securing user's operability.

As a technique for controlling the number of operating cores, a core control technology for calculating a CPU load for individual threads and determining the number of operating cores based on the number of threads whose CPU load exceeds a threshold, has been available. A related art is, for example, Japanese Laid-open Patent Publication No. 2013-92874.

SUMMARY

According to an aspect of the invention, a measuring method of a processing load of a processor, the method includes measuring a first processing load of the processor in executing of a first thread included in a program at a first frequency, the first processing load is equal to or higher than a first threshold, and measuring a second processing load of the processor in executing of a second thread included in the program at a second frequency lower than the first frequency, the second processing load is lower than the first threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram illustrating app/service operation information according to an embodiment;

FIGS. 4A, 4B, and 4C are schematic diagrams illustrating measurement process/thread information according to an embodiment;

FIG. 7 is a schematic diagram illustrating system status information according to an embodiment;

FIGS. 13A and 13B are schematic diagrams illustrating an example of operation of a measurement target thread update process according to an embodiment;

FIGS. 14A and 14B are schematic diagrams illustrating an example of operation of a measurement target thread update process according to an embodiment;

FIGS. 15A and 15B are schematic diagrams illustrating an example of operation of a measurement target thread update process according to an embodiment; and FIGS. 16A and 16B are schematic diagrams illustrating an example of operation of a measurement target thread update process according to an embodiment.

DESCRIPTION OF EMBODIMENTS

In a portable information terminal such as a smartphone, for example, 500 to 1000 threads may be generated. Therefore, calculating the CPU load of the whole threads greatly increases power consumption used for core control. However, reducing the number of threads as measurement targets in order to decrease power consumption makes it impossible to optimize the number of operating cores and may result in an increase in power consumption.

The disclosed technique provides a measuring method, a storage medium, and an information processing apparatus capable of reducing power consumption used for measuring a CPU load.

Hereinafter, with reference to FIGS. 1 to 16, a portable information terminal 100 according to an embodiment will be described. As the portable information terminal 100, for example, a smartphone, a tablet personal computer (PC), or a cellular phone may be used. As an operating system (OS) to be mounted on the portable information terminal 100, Android™ may be used. Android includes an OS kernel and an application framework/library. However, the embodiment is not limited to this; operation systems other than Android may be used.

Figure 1:
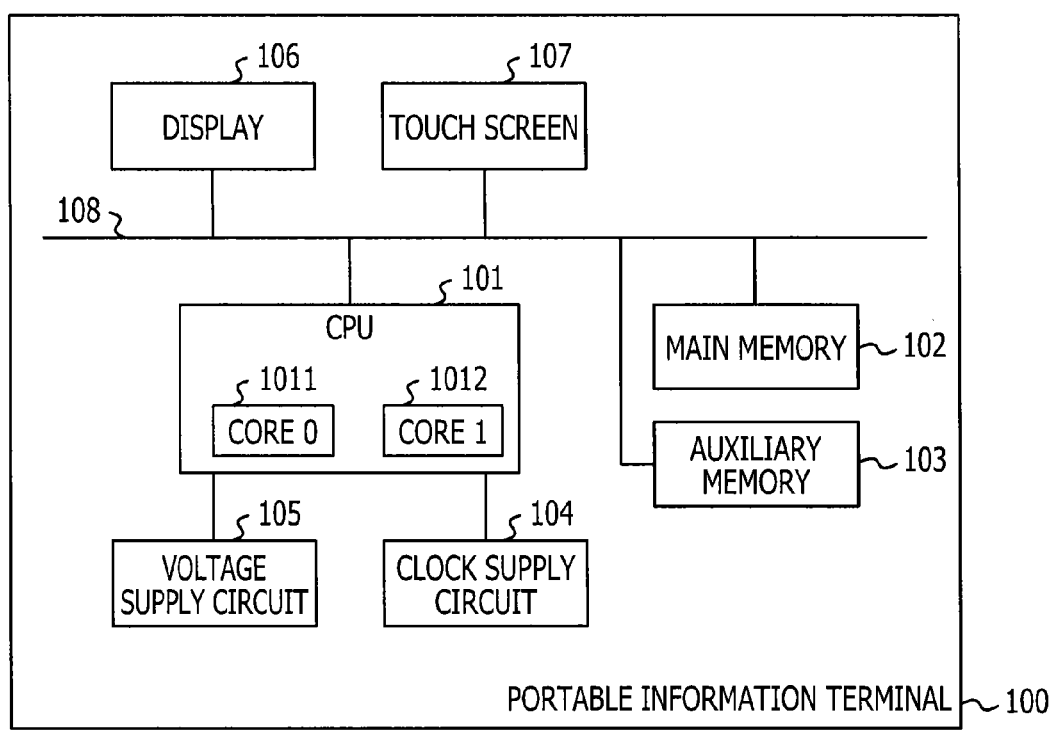
FIG. 1 is a schematic diagram illustrating a hardware configuration of a portable information terminal according to an embodiment.

FIG. 1 is a schematic diagram illustrating a hardware configuration of the portable information terminal 100 according to an embodiment. As illustrated in FIG. 1, the portable information terminal 100 according to the embodiment includes, as hardware modules, a central processing unit (CPU) 101, a main memory 102, an auxiliary memory 103, a clock supply circuit 104, a voltage supply circuit 105, a display 106, and a touch screen 107. These hardware modules are connected with each other, for example, via a bus 108.

The CPU 101 operates based on a clock signal supplied from the clock supply circuit 104 and voltage supplied from the voltage supply circuit 105, and controls various hardware modules of the portable information terminal 100. The CPU 101 is a so-called dual-core CPU, and includes a "core 0" 1011 and a "core 1" 1012. Further, the CPU 101 reads various programs stored in the auxiliary memory 103, loads the programs into the main memory 102, and executes the programs loaded into the main memory 102 to realize various functions. The details of various functions will be described later. In the embodiment, a dual-core CPU is used as the CPU 101. However, the CPU 101 may include any number of cores, such as a quad-core CPU, as long as it is a so-called multi-core CPU.

The main memory 102 stores various programs executed by the CPU 101. Further, the main memory 102 is used as a work area of the CPU 101 and stores various data to be used for processing by the CPU 101. As the main memory 102, for example, a random access memory (RAM) may be used.

The auxiliary memory 103 stores various programs for operating the portable information terminal 100. Various programs include, for example, an application program and an OS which are executed by the portable information terminal 100. As an application program, for example, an "app" whose content (execution results) is displayed on the display 106 and which may be operated on the screen by a user, a "service" whose content is not displayed on the display 106 and which operates in the background for operation of an app, and the like are stored. When a plurality of apps are running, the apps are categorized into apps whose content is displayed on the foreground of the display 106 and which may be actually operated on the screen by a user (foreground apps) and apps whose content is not displayed on the foreground of the display 106 and which may not be actually operated on the screen by a user (background apps). A control program according to the embodiment is also stored in the auxiliary memory 103. As the auxiliary memory 103, a nonvolatile memory, such as a hard disk or a flash memory, may be used.

The display 106 is controlled by the CPU 101 and displays image information to a user. The touch screen 107 is put on the display 106 and enters information of a position contacted by a user's fingertip or a pen tip.

Figure 2:
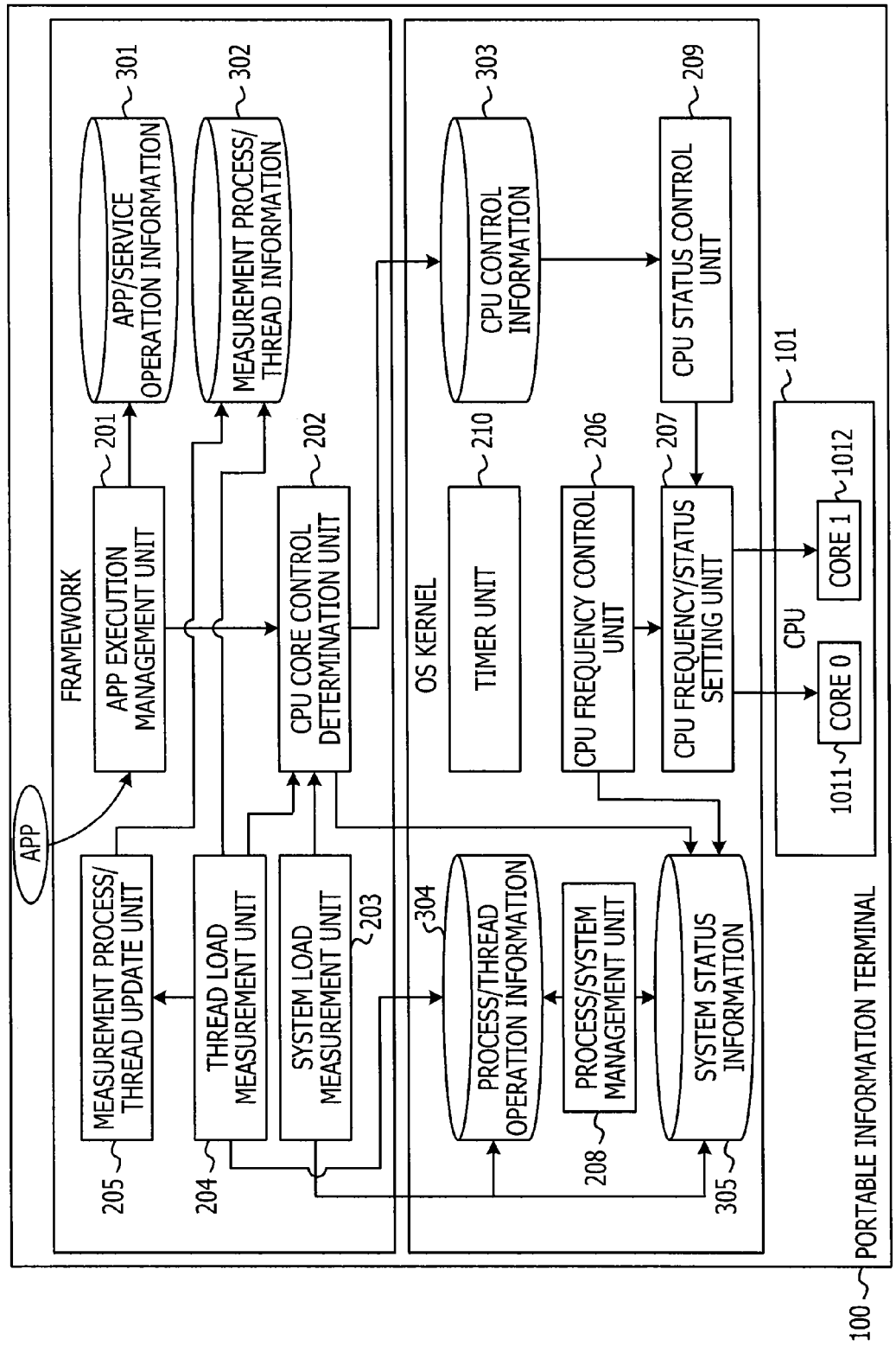
FIG. 2 is a schematic diagram illustrating functional blocks of a portable information terminal according to an embodiment.

FIG. 2 is a schematic diagram illustrating functional blocks of the portable information terminal 100 according to an embodiment. As illustrated in FIG. 2, the portable information terminal 100 according to the embodiment includes an app execution management unit 201, a CPU core control determination unit 202, a system load measurement unit 203, a thread load measurement unit 204, a measurement process/thread update unit 205, a CPU frequency control unit 206, a CPU frequency/status setting unit 207, a process/system management unit 208, a CPU status control unit 209, a timer unit 210, app/service operation information 301, measurement process/thread information 302, CPU control information 303, process/thread operation information 304, and system status information 305.

Any of the app execution management unit 201, the CPU core control determination unit 202, the system load measurement unit 203, the thread load measurement unit 204, the measurement process/thread update unit 205, the CPU frequency control unit 206, the CPU frequency/status setting unit 207, the process/system management unit 208, the CPU status control unit 209, the timer unit 210, the app/service operation information 301, the measurement process/thread information 302, the CPU control information 303, the process/thread operation information 304, and the system status information 305 is realized when the CPU 101 executes an OS kernel or a framework (application framework/library) of Android.

Any of the app/service operation information 301, the measurement process/thread information 302, the CPU control information 303, the process/thread operation information 304, and the system status information 305 is constructed in the auxiliary memory 103.

The app execution management unit 201 manages execution and suspension of programs, such as apps and services. Specifically, when there is a change in the usage environment or process status of an application program such as an app or a service, the app execution management unit 201 updates the "type" or "status" of the app/service operation information 301, which will be described later. As usage environment, foreground and background may be defined. For example, when an application program starts operating in the foreground, in other words, when an application program is started or restarted in the foreground, the app execution management unit 201 accesses the app/service operation information 301, and updates the "type" to "foreground" and the "status" to "operating".

The CPU core control determination unit 202 regularly observes the operation status of the system, and determines whether or not to increase or decrease the number of operating cores of the CPU 101. Specifically, the CPU core control determination unit 202 changes, based on "run_queue_avg (the average value of execution queue lengths of threads)", the number of operating cores of the CPU 101, and the operation frequency of the CPU 101 which are stored in the system status information 305, and the degree of parallelism of threads executed by the CPU 101 acquired by the thread load measurement unit 204, the setting contents of "cpu 1/online" of the CPU control information 303. The details of the degree of parallelism of threads will be described later.

The system load measurement unit 203 regularly refers to the system status information 305 and measures the latest CPU utilization rate of the entire system.

The thread load measurement unit 204 refers to the measurement process/thread information 302 and the process/thread operation information 304, and calculates a CPU usage time for each process and a CPU usage time for each thread. Further, the thread load measurement unit 204 calculates, based on the CPU usage time for each thread, the degree of parallelism of threads executed by the CPU 101. The degree of parallelism of threads represents the number of threads whose CPU usage time is equal to or greater than a threshold of the degree of parallelism. The CPU usage time is an example of a CPU load.

The measurement process/thread update unit 205 updates a measurement target thread, by using the CPU usage time of a measurement target process and the CPU usage time of a measurement target thread which are recorded in the measurement process/thread information 302. Further, the measurement process/thread update unit 205 may renew a measurement target process, based on update of the type of an application program recorded in the app/service operation information 301. For example, the measurement process/thread update unit 205 may set a process whose type is foreground app, and a process related to the process, as measurement targets.

The CPU frequency control unit 206 regularly refers to the system status information 305, and notifies the CPU frequency/status setting unit 207, based on a "CPU utilization rate" of the system status information 305, of a change instruction for the operation frequency of the operating cores of the CPU 101.

The CPU frequency/status setting unit 207 controls, based on an ON/OFF instruction from the CPU status control unit 209, ON/OFF of the "core 1" 1012 of the CPU 101. Further, the CPU frequency/status setting unit 207 controls, based on a change instruction for the operation frequency from the CPU frequency control unit 206, the operation frequency of the operating cores of the CPU 101.

The process/system management unit 208 observes the operation status of a process executed by the CPU 101, and updates an "accumulated operation time" of the process/thread operation information 304. Further, the process/system management unit 208 observes the operation status of the entire system, and updates "online", "offline", "run_queue_ave", "CPU utilization rate", and "operation frequency" of the system status information 305.

The CPU status control unit 209 is started at the timing when "cpu 1/online" of the CPU control information 303 is changed, and the CPU status control unit 209 notifies the CPU frequency/status setting unit 207 of an ON/OFF instruction for the "core 1" 1012. For example, in the case where "cpu 1/online" is changed from "1" to "0" when the "core 1" 1012 is ON, the CPU status control unit 209 notifies the CPU frequency/status setting unit 207 of an OFF instruction for the "core 1" 1012. In contrast, in the case where "cpu 1/online" is changed from "0" to "1" when the "core 1" 1012 is OFF, the CPU status control unit 209 notifies the CPU frequency/status setting unit 207 of an ON instruction for the "core 1" 1012.

The timer unit 210 notifies, for example, the app execution management unit 201, the CPU core control determination unit 202, the system load measurement unit 203, the thread load measurement unit 204, the measurement process/thread update unit 205, the CPU frequency control unit 206, the CPU frequency/status setting unit 207, the process/system management unit 208, and the CPU status control unit 209 of the current time acquired from, for example, a clock circuit (not illustrated in figures).

FIG. 3 is a schematic diagram illustrating the app/service operation information 301 according to an embodiment. As illustrated in FIG. 3, the app/service operation information 301 stores a "process ID", a "program name", a "type", and a "status" for each application program. The app/service operation information 301 stores processes of all the application programs executed by the CPU 101. Therefore, the app/service operation information 301 stores, for example, processes of apps (a foreground app and a background app) and services. As a "type", "foreground" and "background" are defined. As a "status", "running", "standby", "executable", "suspended", and "zombie" are defined. The app execution management unit 201 updates the "type" and the "status" of the app/service operation information 301.

FIGS. 4A, 4B and 4C are schematic diagrams illustrating the measurement process/thread information 302 according to an embodiment. FIG. 4A illustrates a measurement process/thread list 302a in the measurement process/thread information 302, FIG. 4B illustrates a process control chart 302b in the measurement process/thread information 302, and FIG. 4C illustrates a thread control chart 302c in the measurement process/thread information 302.

As illustrated in FIG. 4A, in the measurement process/thread list 302a, identification information (process ID) of a measurement target process and identification information (thread ID) of a measurement target thread whose parent process is the measurement target process are associated with each other. As the record in the first line according to the embodiment, measurement target threads "t01" and "t03" are associated with a measurement target process "p0".

As illustrated in FIG. 4B, in the process control chart 302b, a process ID, an accumulated operation time, and a CPU usage time (delta_time) are associated with a measurement target process. As the record in the first line according to the embodiment, an accumulated operation time "4640" and a CPU usage time "8" are associated with the process ID "p0".

As illustrated in FIG. 4C, in the thread control chart 302c, a thread ID, an accumulated operation time, and a CPU usage time (delta_time) are associated with a measurement target thread. As the record in the first line according to the embodiment, an accumulated operation time "750" and a CPU usage time "5" are associated with the thread ID "t01".

Figure 5:
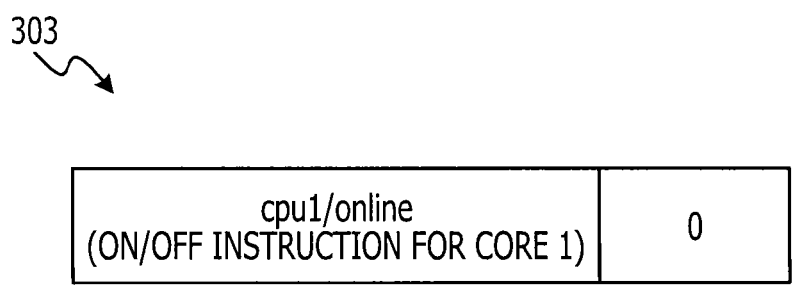
FIG. 5 is a schematic diagram illustrating CPU control information according to an embodiment.

FIG. 5 is a schematic diagram illustrating the CPU control information 303 according to an embodiment. As illustrated in FIG. 5, the CPU control information 303 stores, as "cpu 1/online" for determining ON/OFF of the "core 1" 1012 of the CPU 101, "0" or "1". In the embodiment, "0" is assigned for an "OFF instruction" for the "core 1" 1012, and "1" is assigned for an "ON instruction" for the "core 1" 1012. Therefore, when "0" is registered for "cpu 1/online" of the CPU control information 303, the CPU status control unit 209 notifies the CPU frequency/status setting unit 207 of an "OFF instruction" for the "core 1" 1012. When "1" is registered for "cpu 1/online" of the CPU control information 303, the CPU status control unit 209 notifies the CPU frequency/status setting unit 207 of an "ON instruction" for the "core 1" 1012.

Figure 6:
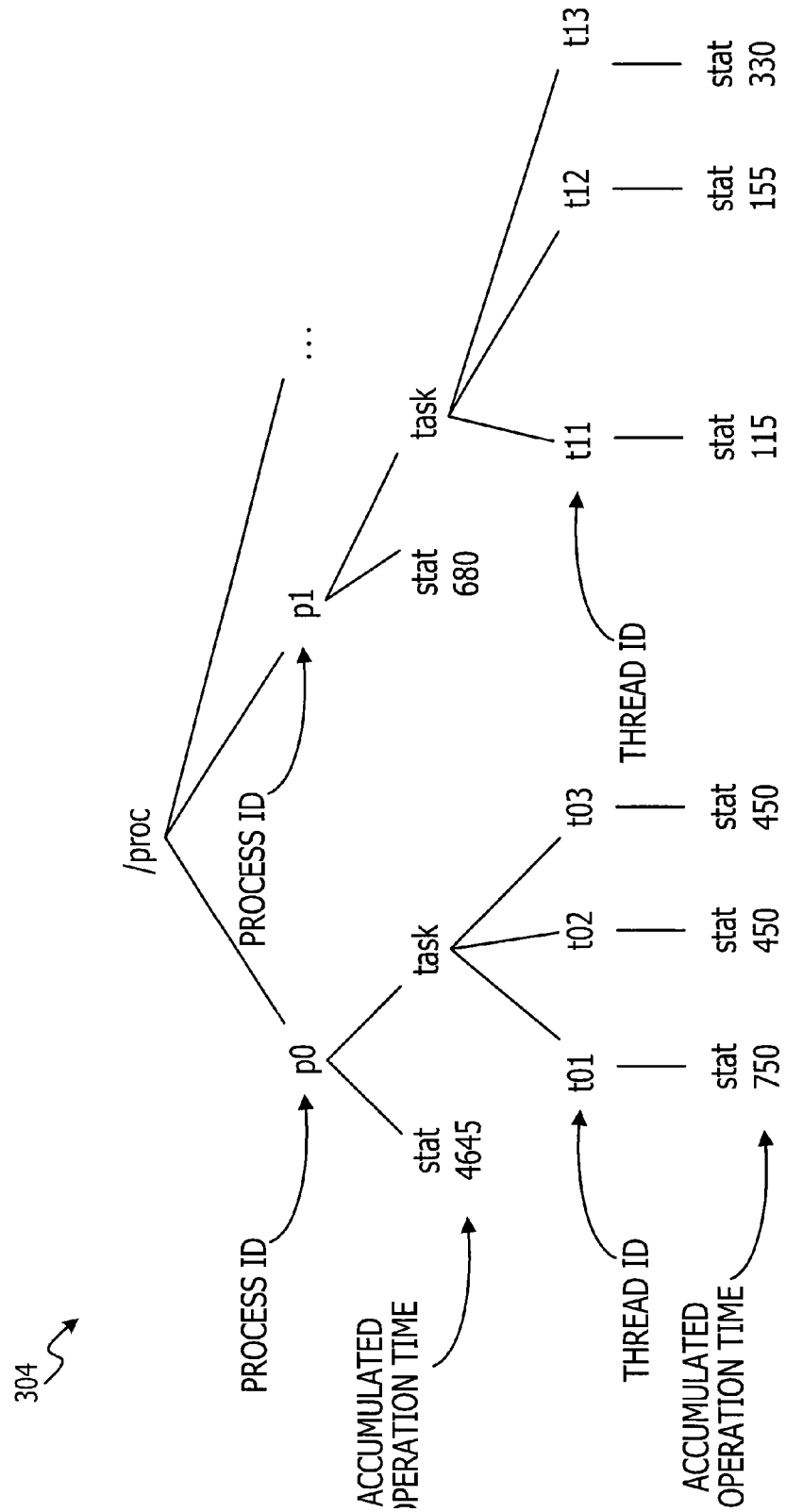
FIG. 6 is a schematic diagram illustrating process/thread operation information according to an embodiment.

FIG. 6 is a schematic diagram illustrating the process/thread operation information 304 according to an embodiment. As illustrated in FIG. 6, in the process/thread operation information 304, a process executed by the CPU 101 and a thread whose parent process is the process are associated with each other. Further, the process/thread operation information 304 records an accumulated operation time for each process and each thread. The process/thread operation information 304 stores all the processes and all the threads executed by the CPU 101. Therefore, the process/thread operation information 304 also stores processes and threads which are not measurement targets according to the embodiment, and corresponding accumulated operation times.

An accumulated operation time is an accumulated value of operation times (milliseconds) starting from the start time of a process or thread. The process/thread operation information 304 is updated at each observation by the process/system management unit 208.

FIG. 7 is a schematic diagram illustrating the system status information 305 according to an embodiment. As illustrated in FIG. 7, the system status information 305 stores "Online (online CPU core number)", "Offline (offline CPU core number)", "run_queue_avg", "CPU utilization rate (%)", and "operation frequency (MHz)". As "Online", the number of a CPU core that is operating is stored. As "Offline", the number of a CPU core that is not operating is stored. Therefore, when both the "core 0" 1011 and the "core 1" 1012 are operating, "0" and "1" are recorded as "Online", and no number is recorded as "Offline". When only the "core 0" 1011 is operating, "0" is recorded as "Online", and "1" is recorded as "Offline". "run_queue_avg" represents the latest average value of the numbers of threads that are ready for execution by the CPU 101. "CPU utilization rate" represents the CPU utilization rate of the entire system, that is, the total execution time of the whole threads per unit time. "Operation frequency" represents the operation frequency of the CPU 101. "Online", "Offline", "run_queue_avg", "CPU utilization rate", and "operation frequency" of the system status information 305 are updated by the process/system management unit 208 at each observation.

Figure 8:
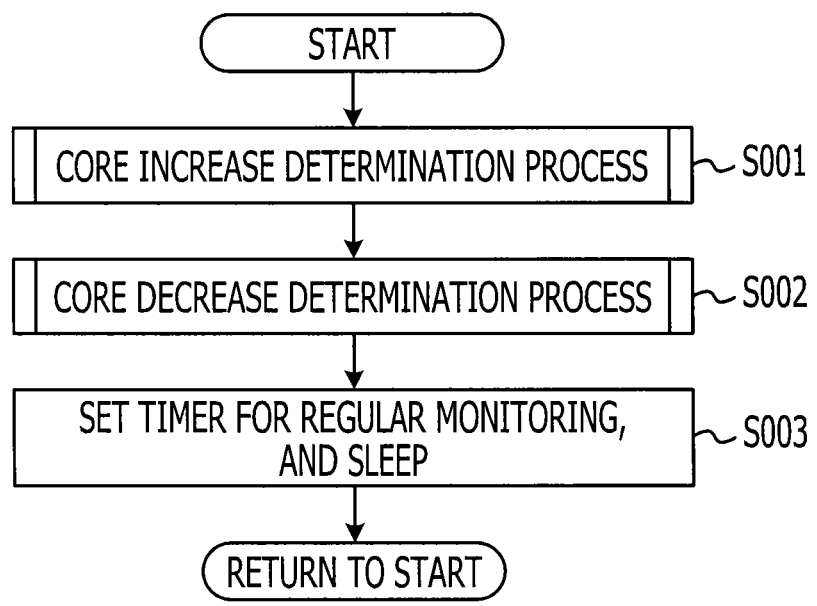
FIG. 8 is a flowchart illustrating a CPU core control determination process according to an embodiment.

FIG. 8 is a flowchart illustrating a CPU core control determination process according to an embodiment. As illustrated in FIG. 8, the CPU core control determination unit 202 first executes a "core increase determination process" for determining whether or not to increase the number of operating cores of the CPU 101 (step S001). The details of the "core increase determination process" will be described later.

Next, the CPU core control determination unit 202 executes a "core decrease determination process" for determining whether or not to decrease the number of operating cores of the CPU 101 (step S002). The details of the "core decrease determination process" will be described later.

Then, the CPU core control determination unit 202 sets a timer for regular monitoring and enters a sleep state (step S003). The setting time of the timer is not particularly limited. In the embodiment, however, the setting time of the timer is several tens of milliseconds. After the setting time of the timer has expired, the CPU core control determination unit 202 executes processing from the start of the "CPU core control determination process".

Figure 9:
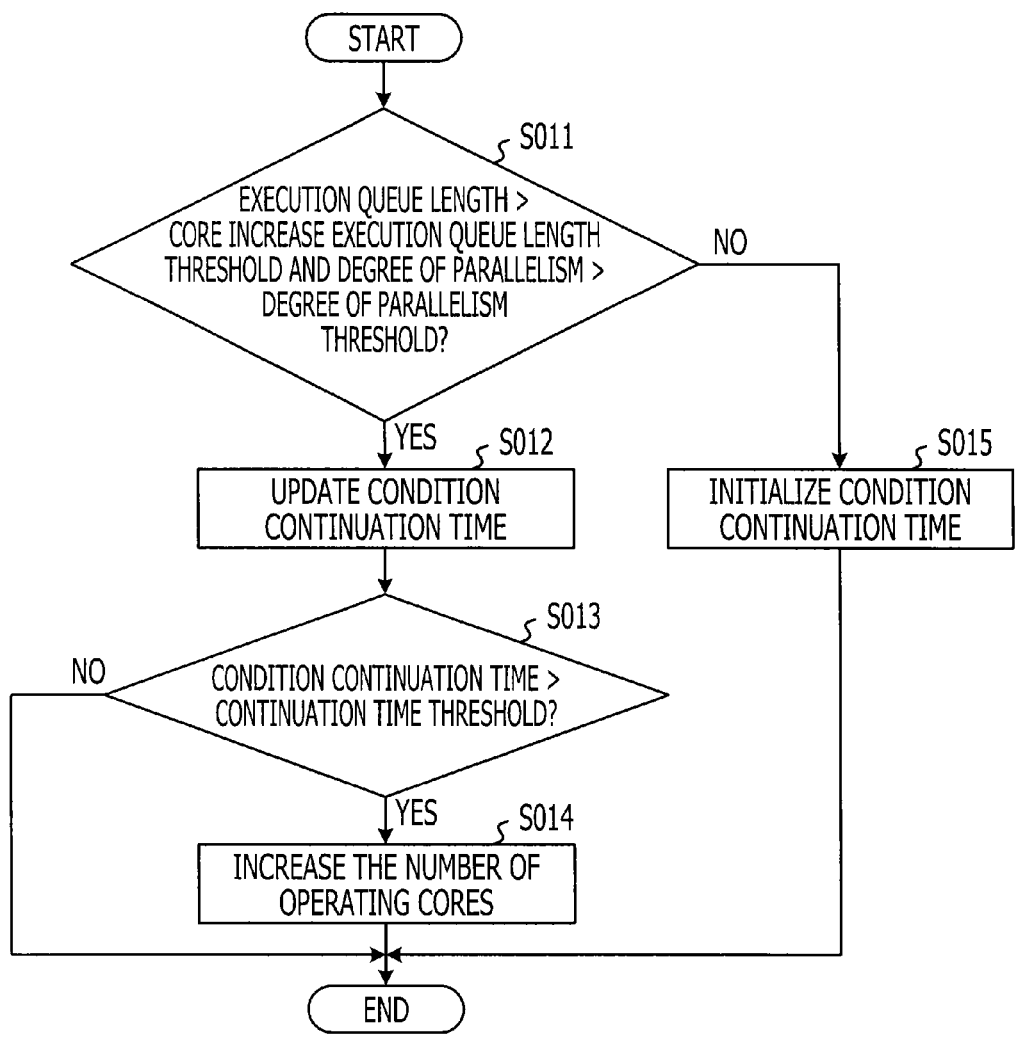
FIG. 9 is a flowchart illustrating a core increase determination process according to an embodiment.

FIG. 9 is a flowchart illustrating a core increase determination process according to an embodiment. It is assumed that only the "core 0" 1011 of the CPU 101 is operating, and a determination process as to whether or not to start operating the "core 1" 1012 will be described below.

As illustrated in FIG. 9, the CPU core control determination unit 202 refers to the system status information 305, and determines whether or not the execution queue length of threads is greater than a predetermined core increase execution queue length threshold and the degree of parallelism of threads is greater than a predetermined degree of parallelism threshold (step S011). In the embodiment, the core increase execution queue length threshold is set to 1.5 and the degree of parallelism threshold is set to 2.

In the case where it has not been determined that the execution queue length of threads is greater than the core increase execution queue length threshold and that the degree of parallelism of threads is greater than the degree of parallelism threshold (No in step S011), that is, in the case where it has not been determined that the execution queue length of threads is greater than 1.5 and that the degree of parallelism of threads is greater than 2, the CPU core control determination unit 202 initializes a condition continuation time, based on time information obtained from the timer unit 210 (step S015), that is, sets the condition continuation time to "0 (seconds)", and terminates the core increase determination process according to the embodiment.

In contrast, in the case where it has been determined that the execution queue length of threads is greater than the core increase execution queue length threshold and that the degree of parallelism of threads is greater than the degree of parallelism threshold (Yes in step S011), that is, in the case where it has been determined that the execution queue length of threads is greater than 1.5 and that the degree of parallelism of threads is greater than 2, the CPU core control determination unit 202 updates the condition continuation time, based on time information obtained from the timer unit 210 (step S012).

Then, the CPU core control determination unit 202 determines whether or not the condition continuation time is greater than a predetermined continuation time threshold (step S013). In the embodiment, the continuation time threshold is set to 300 (milliseconds).

Here, in the case where it has not been determined that the condition continuation time is greater than the continuation time threshold (No in step S013), that is, in the case where it has been determined that the condition continuation time is shorter than or equal to 300 milliseconds, the CPU core control determination unit 202 terminates the core increase determination process according to the embodiment.

In contrast, in the case where it has been determined that the condition continuation time is greater than the continuation time threshold (Yes in step S013), that is, in the case where it has been determined that the condition continuation time is longer than 300 milliseconds, the CPU core control determination unit 202 causes the "core 1" 1012 of the CPU 101 to operate, that is, increases the number of operating cores of the CPU 101 (step S014), and terminates the core increase determination process according to the embodiment. Specifically, the CPU core control determination unit 202 updates "cpu 1/online" of the CPU control information 303 to "1". When "cpu 1/online" is updated to "1", the CPU status control unit 209 notifies the CPU frequency/status setting unit 207 of an ON instruction for the "core 1" 1012, resulting in both the "core 0" 1011 and the "core 1" 1012 being in operation.

Figure 10:
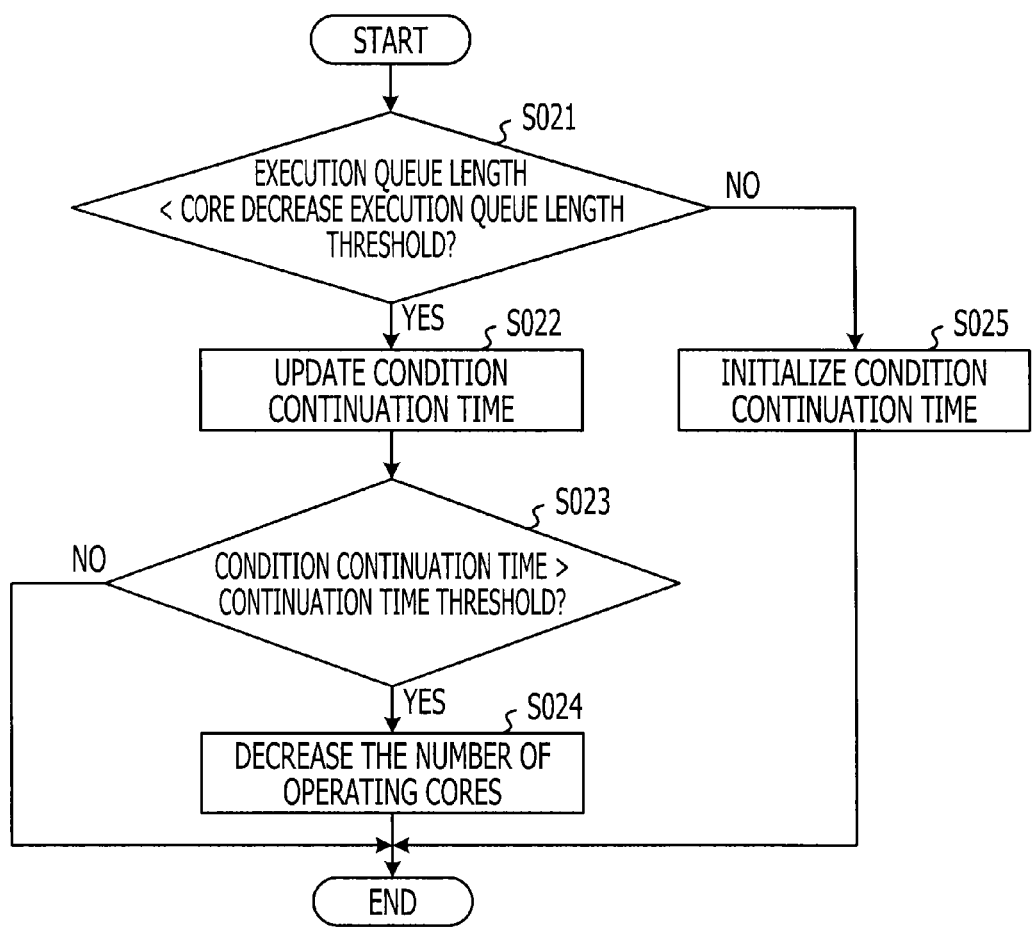
FIG. 10 is a flowchart illustrating a core decrease determination process according to an embodiment.

FIG. 10 is a flowchart illustrating a core decrease determination process according to an embodiment. It is assumed that both the "core 0" 1011 and the "core 1" 1012 are operating, and a determination process as to whether or not to suspend operation of the "core 1" 1012 will be described below.

As illustrated in FIG. 10, the CPU core control determination unit 202 refers to the system status information 305, and determines whether or not the execution queue length of threads is smaller than a predetermined core decrease execution queue length threshold (step S021). In the embodiment, the core decrease execution queue length threshold is set to 1.2.

In the case where it has not been determined that the execution queue length of threads is smaller than the core decrease execution queue length threshold (No in step S021), that is, in the case where it has been determined that the execution queue length of threads is equal to or greater than 1.2, the CPU core control determination unit 202 initializes a condition continuation time, based on time information obtained from the timer unit 210 (step S025), that is, sets the condition continuation time to "0 (seconds)", and terminates the core decrease determination process according to the embodiment.

In contrast, in the case where it has been determined that the execution queue length of threads is smaller than the core decrease execution queue length threshold (Yes in step S021), that is, in the case where it has been determined that the execution queue length of threads is smaller than 1.2, the CPU core control determination unit 202 updates the condition continuation time, based on time information obtained from the timer unit 210 (step S022).

Then, the CPU core control determination unit 202 determines whether or not the condition continuation time is greater than a predetermined continuation time threshold (step S023). In the embodiment, the continuation time threshold is set to 300 (milliseconds).

Here, in the case where it has not been determined that the condition continuation time is greater than the continuation time threshold (No in step S023), that is, in the case where it has been determined that the condition continuation time is shorter than or equal to 300 milliseconds, the CPU core control determination unit 202 terminates the core decrease determination process according to the embodiment.

In contrast, in the case where it has been determined that the condition continuation time is greater than the continuation time threshold (Yes in step S023), that is, in the case where it has been determined that the condition continuation time is longer than 300 milliseconds, the CPU core control determination unit 202 suspends operation of the "core 1" 1012 of the CPU 101, that is, decreases the number of operating cores of the CPU 101 (step S024). Specifically, the CPU core control determination unit 202 updates "cpu 1/online" of the CPU control information 303 to "0". When "cpu 1/online" is updated to "0", the CPU status control unit 209 notifies the CPU frequency/status setting unit 207 of an OFF instruction for the "core 1" 1012, resulting in operation of the "core 1" 1012 being suspended.

Figure 11:
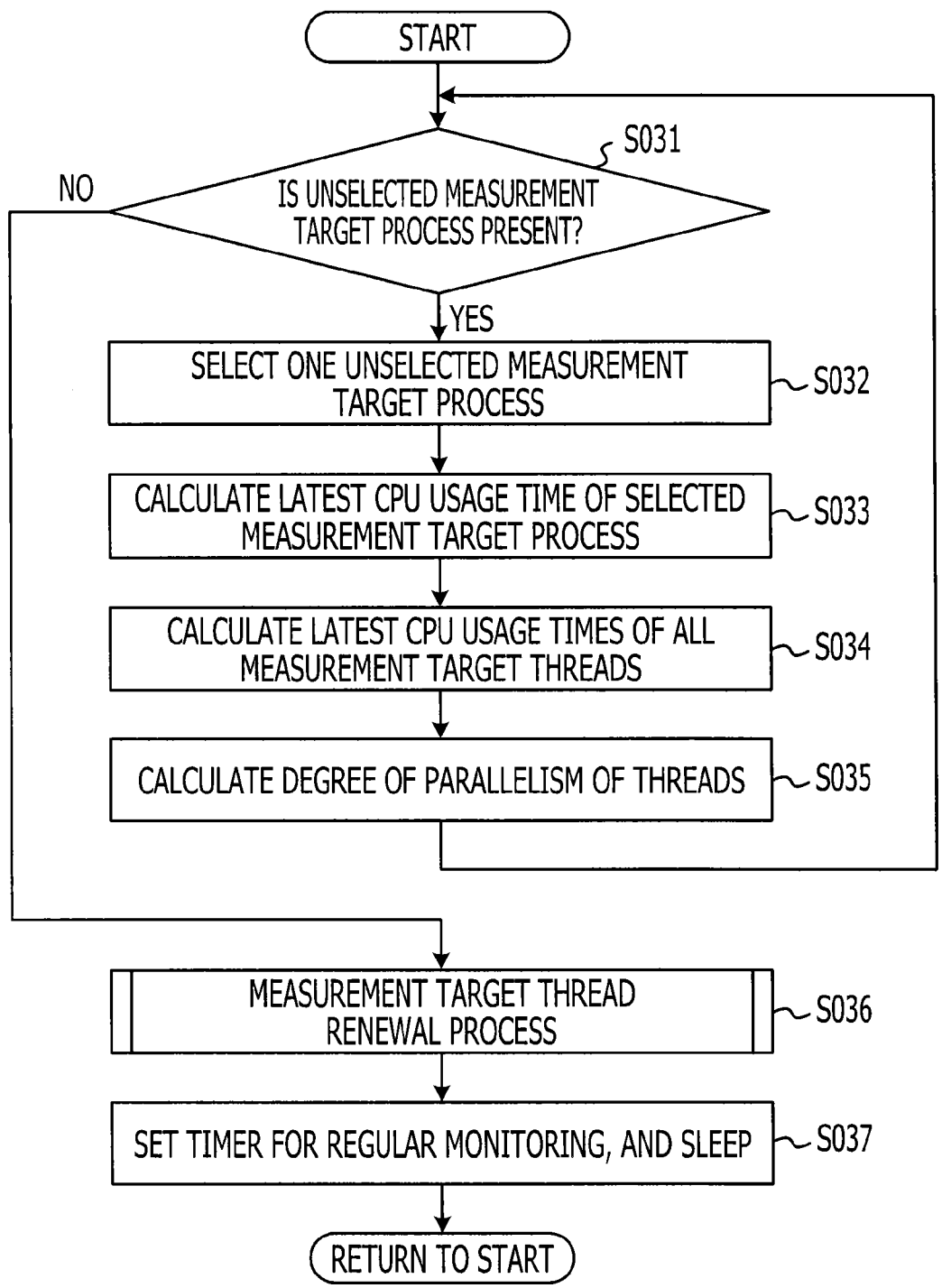
FIG. 11 is a flowchart illustrating a thread load measurement process according to an embodiment.

FIG. 11 is a flowchart illustrating a thread load measurement process according to an embodiment. As illustrated in FIG. 11, the thread load measurement unit 204 determines whether or not an unselected measurement target process is present in the measurement process/thread list 302a of the measurement process/thread information 302 (step S031).

Here, in the case where it has not been determined that an unselected measurement target process is present (No in step S031), that is, in the case where all the measurement target processes recorded in the measurement process/thread list 302a have already been selected, the thread load measurement unit 204 instructs the measurement process/thread update unit 205 to start a measurement target thread update process (step S036). The details of the measurement target thread update process will be described later.

The thread load measurement unit 204 sets a timer for regular monitoring and enters a sleep state (step S037). The setting time of the timer is not particularly limited. In the embodiment, however, the setting time of the timer is several tens of milliseconds. After the setting time of the timer has expired, the thread load measurement unit 204 executes processing from the start of the thread load measurement process.

In contrast, in the case where it has been determined that an unselected measurement target process is present (Yes in step S031), the thread load measurement unit 204 selects one unselected measurement target process from the measurement process/thread list 302a (step S032).

Next, the thread load measurement unit 204 refers to the process control chart 302b of the measurement process/thread information 302, and calculates the latest CPU usage time of the selected measurement target process (step S033).

Specifically, the thread load measurement unit 204 first refers to the process control chart 302b, and acquires an accumulated operation time of the selected measurement target process, that is, an accumulated operation time up until the previous measurement. Then, the thread load measurement unit 204 refers to the process/thread operation information 304, and acquires an accumulated operation time of the selected process, that is, an accumulated operation time up until the present measurement. Further, the thread load measurement unit 204 calculates the difference between the accumulated operation time obtained from the process control chart 302b and the accumulated operation time obtained from the process/thread operation information 304, and defines the difference as the latest CPU usage time of the measurement target process.

The thread load measurement unit 204 updates the accumulated operation time of the measurement target process recorded in the process control chart 302b, by using the accumulated operation time obtained from the process/thread operation information 304. Further, the thread load measurement unit 204 updates the CPU usage time of the measurement target process recorded in the process control chart 302b, by using the latest CPU usage time of the measurement target process.

In the embodiment, the CPU usage time of a measurement target process is used as a CPU load. However, the embodiment is not limited to this. For example, the latest immediate CPU utilization rate of a measurement target process may be used as a CPU load. Specifically, the difference between an accumulated operation time obtained from the process control chart 302b and an accumulated operation time obtained from the process/thread operation information 304 may be divided by the elapsed time between the previous measurement and the present measurement, and the obtained value may be defined as the latest CPU utilization rate of a measurement target process.

Next, the thread load measurement unit 204 refers to the thread control chart 302c of the measurement process/thread information 302, and calculates the latest CPU usage times of all the threads associated with the selected measurement target process, that is, all the measurement target threads (step S034).

Specifically, the thread load measurement unit 204 first refers to the measurement process/thread list 302a, and specifies a measurement target thread associated with the selected measurement target process. Then, the thread load measurement unit 204 refers to the thread control chart 302c, and acquires an accumulated operation time of the measurement target thread associated with the selected measurement target process, that is, an accumulated operation time up until the previous measurement. Further, the thread load measurement unit 204 refers to the process/thread operation information 304, and acquires an accumulated operation time of all the measurement target threads associated with the selected measurement target process, that is, an accumulated operation time up until the present measurement. Then, the thread load measurement unit 204 calculates the difference between the accumulated operation time obtained from the thread control chart 302c and the accumulated operation time obtained from the process/thread operation information 304, and defines the difference as the latest CPU usage time of the measurement target thread.

The thread load measurement unit 204 updates the accumulated operation time of the measurement target thread recorded in the thread control chart 302c, by using the accumulated operation time obtained from the process/thread operation information 304. Further, the thread load measurement unit 204 updates the CPU usage time of the measurement target thread recorded in the thread control chart 302c, by using the latest CPU usage time of the measurement target thread.

In the embodiment, the CPU usage time of a measurement target thread is used as a CPU load. However, the embodiment is not limited to this. For example, the latest CPU utilization rate of a measurement target thread may be used as a CPU load. Specifically, the difference between an accumulated operation time obtained from the thread control chart 302c and an accumulated operation time obtained from the process/thread operation information 304 may be divided by the elapsed time between the previous measurement and the present measurement, and the obtained value may be defined as the latest CPU utilization rate of the measurement target thread.

Then, the thread load measurement unit 204 calculates, based on the CPU usage time of the measurement target thread and a predetermined CPU usage time threshold, the degree of parallelism of threads executed by the CPU 101 (step S035). Specifically, the thread load measurement unit 204 calculates the number of threads whose CPU usage time is greater than the CPU usage time threshold.

Next, the thread load measurement unit 204 determines again whether or not an unselected measurement target process is present in the measurement process/thread list 302a (step S031).

Figure 12:
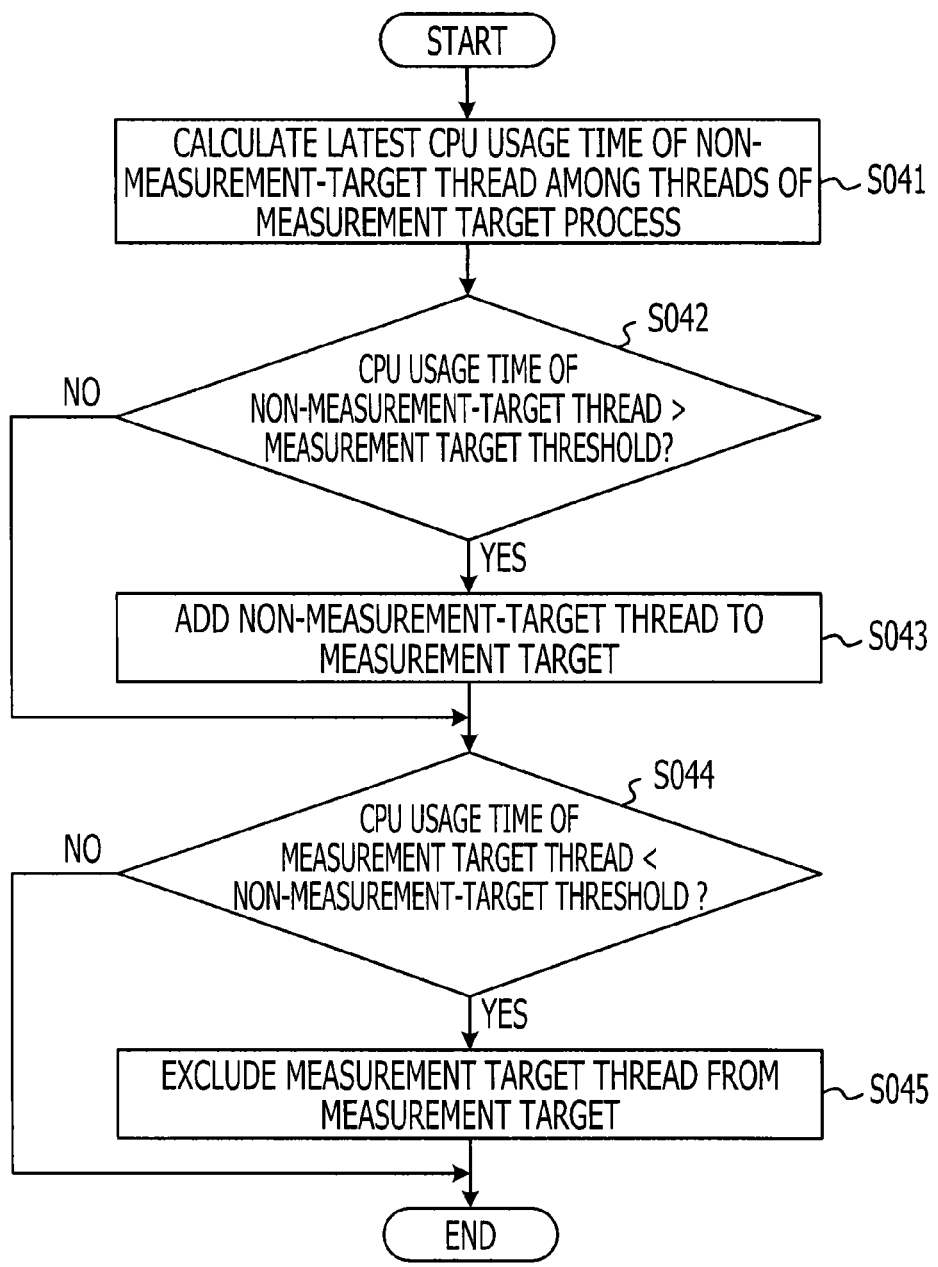
FIG. 12 is a flowchart illustrating a measurement target thread update process according to an embodiment.

FIG. 12 is a flowchart illustrating a measurement target thread update process according to an embodiment. FIGS. 13A, 13B, 14A, 14B, 15A, 15B, 16A, and 16B are schematic diagrams illustrating operation examples of a measurement target thread update process according to an embodiment.

As illustrated in FIG. 12, the measurement process/thread update unit 205 calculates the latest CPU usage time of a non-measurement-target thread among threads generated from a measurement target process (step S041).

Specifically, the measurement process/thread update unit 205 first refers to the process control chart 302b and the thread control chart 302c of the measurement process/thread information 302, and acquires the CPU usage time of the measurement target process and the CPU usage time of a measurement target thread. Then, the measurement process/thread update unit 205 subtracts, for each measurement target process, the total sum of CPU usage times of all the measurement target threads whose parent process is the measurement target process, from the CPU usage time of the measurement target process, and obtains the total sum of the latest CPU usage times of all the non-measurement-target threads. Furthermore, the measurement process/thread update unit 205 divides the total sum of the latest CPU usage times of all the non-measurement-target threads by the number of the non-measurement-target threads, and calculates the latest CPU usage time of a non-measurement-target thread, that is, the average value of the CPU usage times of threads.

For example, as illustrated in FIG. 13A, the measurement process/thread update unit 205 subtracts "5 (=2+2+1)", which is the total sum of the CPU usage times "2", "2", and "1" of measurement target threads "t20", "t25", and "t26" whose parent process is a process "p2", from the CPU usage time "20" of the process "p2", and obtains the total sum "15" of the latest CPU usage times of all the non-measurement-target threads. Then, the measurement process/thread update unit 205 divides "15", which is the total sum of the latest CPU usage times of all the non-measurement-target threads, by "4", which is the number of the non-measurement-target threads, and obtains "3.75", which is the average value of the latest CPU usage times of all the non-measurement-target threads.

Next, the measurement process/thread update unit 205 determines whether or not the CPU usage time of a non-measurement-target thread is greater than a predetermined measurement target threshold (first threshold) (step S042). The predetermined measurement target threshold may be determined depending on the processing capacity of each core of the CPU 101.

Here, in the case where it has been determined that the CPU usage time of a non-measurement-target thread is greater than the measurement target threshold (Yes in step S042), the measurement process/thread update unit 205 adds all the non-measurement-target threads to the measurement target thread (step S043). Specifically, the measurement process/thread update unit 205 adds the thread IDs of all the non-measurement-target threads to the thread control chart 302c of the measurement process/thread information 302. Further, the measurement process/thread update unit 205 adds the thread IDs of all the non-measurement-target threads to the measurement process/thread list 302a of the measurement process/thread information 302.

For example, as illustrated in FIGS. 13A and 13B, the measurement process/thread update unit 205 adds all the non-measurement-target threads "t21", "t22", "t23", and "t24" whose parent process is the process "p2", to the thread control chart 303c. Further, as illustrated in FIGS. 14A and 14B, the measurement process/thread update unit 205 adds all the non-measurement-target threads "t21", "t22", "t23", and "t24" to the measurement process/thread information 302a. Accordingly, all the threads generated from the measurement target process "p2" are defined as the measurement targets of the CPU usage time.

Next, the measurement process/thread update unit 205 determines whether or not the CPU usage time of a measurement target thread is smaller than a predetermined non-measurement-target threshold (first threshold) (step S044). In the case where it has not been determined that the CPU usage time of the non-measurement-target thread is greater than the measurement target threshold (No in step S042), that is, in the case where the CPU usage time of the non-measurement-target thread is smaller than or equal to the measurement target threshold, the measurement process/thread update unit 205 determines whether or not the CPU usage time of the measurement target thread is smaller than the predetermined non-measurement-target threshold (step S044). The non-measurement-target threshold may be determined depending on the processing capacity of each core of the CPU 101.

Here, in the case where it has not been determined that the CPU usage time of the measurement target thread is smaller than the non-measurement-target threshold (No in step S044), the measurement process/thread update unit 205 terminates the measurement target thread update process according to the embodiment.

In contrast, in the case where it has been determined that the CPU usage time of the measurement target thread is smaller than the non-measurement-target threshold (Yes in step S044), the measurement process/thread update unit 205 excludes the thread, that is, the thread whose CPU usage time has been determined to be smaller than the non-measurement-target threshold, from the measurement target (step S045). Specifically, the measurement process/thread update unit 205 deletes, from the thread control chart 302c, a record, that is, the thread ID, the accumulated operation time, and the CPU usage time, of the thread whose CPU usage time has been determined to be smaller than the non-measurement-target threshold. Further, the measurement process/thread update unit 205 deletes, from the measurement process/thread list 302a, the thread ID of the thread whose CPU usage time has been determined to be smaller than the non-measurement-target threshold.

For example, as illustrated in FIGS. 15A and 15B, the measurement process/thread update unit 205 deletes, from the thread control chart 302c, records of threads "t21", "t22", "t23", "t25", and "t26" whose CPU usage times have been determined to be smaller than the non-measurement-target threshold. Further, as illustrated in FIGS. 16A and 16B, the measurement process/thread update unit 205 deletes, from the measurement process/thread list 302a, the threads "t21", "t22", "t23", "t25", and "t26" whose CPU usage times have been determined to be smaller than the non-measurement-target threshold. Thus, among the threads generated from the measurement target process "p2", only the thread whose latest CPU usage time is greater than the non-measurement-target threshold is defined as a measurement target of the CPU usage time.

Then, the measurement process/thread update unit 205 terminates the measurement target thread update process according to the embodiment.

As described above, a thread whose CPU usage time is greater than a measurement target threshold (first threshold) is defined as a measurement target of the CPU usage time. However, a thread whose CPU usage time is smaller than a non-measurement-target threshold (first threshold) is deleted from the measurement target of the CPU usage time. In other words, the measurement process/thread update unit 205 according to the embodiment increases the measurement frequency (first frequency) of the CPU usage time of the thread whose CPU usage time is greater than the measurement target threshold compared to the measurement frequency (second frequency) of the CPU usage time of the thread whose CPU usage time is smaller than the non-measurement-target threshold.

The measurement process/thread update unit 205 according to the embodiment determines, based on the latest CPU usage time of a non-measurement-target thread, whether or not to add the non-measurement-target thread to the measurement target. However, the embodiment is not limited to this. For example, the measurement process/thread update unit 205 may determine whether or not to add a non-measurement-target thread to the measurement target, based on the total sum of the latest CPU usage times of the non-measurement-target threads. Alternatively, the measurement process/thread update unit 205 may determine whether or not to add a non-measurement-target thread to the measurement target, based on the proportion of the latest CPU usage time of the non-measurement-target thread to the CPU usage time of the parent process thereof. Furthermore, the measurement process/thread update unit 205 may determine whether or not to add the thread to the measurement target, based on whether the time elapsed from deletion of the thread from the measurement target has reached a predetermined time.

The measurement process/thread update unit 205 according to the embodiment also determines whether or not to delete a measurement target thread from the measurement target, based on the latest CPU usage time of the measurement target thread. However, the embodiment is not limited to this. For example, the measurement process/thread update unit 205 may determine whether or not to delete a thread from the measurement target, based on the proportion of the latest CPU usage time of the measurement target thread to the CPU usage time of the parent process thereof. Further, in the case where the CPU usage time of the measurement target thread is smaller than the non-measurement-target threshold, the measurement process/thread update unit 205 may simply reduce the frequency of measurement of the CPU usage time of the thread. Furthermore, the measurement process/thread update unit 205 may determine the measurement frequency based on the CPU usage time of the measurement target thread. For example, in the case where the CPU usage time of a first thread, among measurement target threads, is shorter than the CPU usage time of a second thread, the measurement frequency of the first thread may be reduced compared to the measurement frequency of the second thread. In other words, it is considered that the smaller the CPU usage time, the longer it takes for the CPU usage time to become worth measuring, and therefore the measurement frequency may be reduced.

According to the embodiment, a thread whose CPU usage time (CPU load) is smaller than a non-measurement-target threshold is deleted from a measurement target of the CPU usage time, and when the CPU usage time of the non-measurement-target thread exceeds a measurement target threshold, all the non-measurement-target threads are reset to the measurement targets of the CPU usage time. Therefore, measurement of the CPU usage time of a low-load thread which has a little effect on the degree of parallelism of threads may be omitted. Thus, the cost for measuring a CPU usage time for each thread, for example, power consumption for measuring a CPU usage time, and the like, may be reduced.

The measurement process/thread update unit 205 according to the embodiment obtains the total sum of CPU usage times of non-measurement-target threads by subtracting the total sum of CPU usage times of all the measurement target threads from the CPU usage time of the parent process of the threads. However, the embodiment is not limited to this. For example, the measurement process/thread update unit 205 may obtain the total sum of CPU usage times of the non-measurement-target threads by subtracting the total sum of CPU usage times of all the measurement target threads executed by the CPU 101 from the CPU usage time of the entire system.

In the embodiment, a dual-core CPU is exemplified. However, the embodiment is not limited to this. The embodiment may be applied to multi-core CPUs of other types, such as a quad-core CPU.

Further, in the embodiment, for example, a smartphone and a tablet PC are assumed as the portable information terminal 100. However, the embodiment is not limited to them. The embodiment may be applied, for example, to a desktop PC and a server apparatus as long as it is provided with a multi-core CPU.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A measuring method of a processing load of a processor, the method comprising:
    measuring, at a first time, a processing load of the processor in executing of a first thread included in a program;
    comparing the measured processing load with a first threshold value;
    when the measured processing load is equal to or higher than the first threshold value, measuring the processing load repeatedly at a first time interval after the first time; and
    when the measured processing load is lower than the first threshold value, measuring the processing load repeatedly at a second time interval longer than the first time interval after the first time so that processing resources expended on measuring the processing load of the thread is less than processing resources expended if measuring repeatedly at the first time interval.

2. The measuring method according to claim 1, further comprising:
stopping the measuring of the processing load repeatedly at the first time interval.

3. The measuring method according to claim 2, further comprising:
measuring a whole processing load of the processor caused by a process that includes the thread and another thread; and
after the measuring of the processing load repeatedly at the first time interval is stopped, starting the measuring of the processing load repeatedly at the second time interval.

4. The measuring method according to claim 2, further comprising:
after the measuring of the processing load repeatedly at the first time interval is stopped, starting the measuring of the processing load repeatedly at the second time interval, when a predetermined period has elapsed.

5. The measuring method according to claim 1, wherein
the processor includes a plurality of cores, and
the first time interval is determined based on a processing capacity of the plurality of cores.

6. The measuring method according to claim 1, wherein
the processor includes a plurality of cores,
a number of cores used for execution is selected based on a comparison of an execution queue length of threads to a predetermined core execution length.

7. A non-transitory computer-readable storage medium storing a program that causes a computer including a processor to execute a procedure, the procedure comprising:
measuring, at a first time, a processing load of the processor in executing of a thread included in a program;
comparing the measured processing load with a first threshold value;
when the measured processing load is equal to or higher than the first threshold value, measuring the processing load repeatedly at a first time interval after the first time; and
when the measured processing load is lower than the first threshold value, measuring the processing load repeatedly at a second time interval longer than the first time interval after the first time so that processing resources expended on measuring the processing load of the thread is less than processing resources expended if measuring repeatedly at the first time interval.

8. The non-transitory computer-readable storage medium according to claim 7, the procedure further comprising:
stopping the measuring of the processing load repeatedly at the first time interval.

9. The non-transitory computer-readable storage medium according to claim 8, the procedure further comprising:
measuring a whole processing load of the processor caused by a process including the thread and another thread; and
after the measuring of the processing load repeatedly at the first time interval is stopped, starting the measuring of the processing load repeatedly at the second time interval.

10. The non-transitory computer-readable storage medium according to claim 8, the procedure further comprising:
after the measuring of the processing load repeatedly at the first time interval is stopped, starting the measuring of the processing load repeatedly at the second time interval, when a predetermined period has elapsed.

11. The non-transitory computer-readable storage medium according to claim 7, wherein
the processor includes a plurality of cores, and
the first time interval is determined based on a processing capacity of the plurality of cores.

12. An information processing apparatus comprising:
a memory; and
a processor coupled to the memory and configured to
measure, at a first time, a first processing load of the processor in executing of a thread included in a program, the first processing load is equal to or higher than a first threshold;
compare the measured processing load with a first threshold value;
when the measured processing load is equal to or higher than the first threshold value, measure the processing load repeatedly at a first time interval after the first time; and
when the measured processing load is lower than the first threshold value, measure the processing load repeatedly at a second time interval longer than the first time interval after the first time so that processing resources expended on measuring the processing load of the thread is less than processing resources expended if measured repeatedly at the first time interval.

13. The information processing apparatus according to claim 12, the processor is configured to
stop the measuring of the processing load repeatedly at the first time interval.

14. The information processing apparatus according to claim 13, the processor is configured to
measure a whole processing load of the processor caused by a process including the thread and another thread; and
after the measuring of the processing load repeatedly at the first time interval is stopped, starting the measuring of the processing load repeatedly at the second time interval.

15. The information processing apparatus according to claim 13, the processor is configured to
after the measuring of the processing load repeatedly at the first time interval is stopped, starting the measuring of the processing load repeatedly at the second time interval, when a predetermined period has elapsed.

16. The information processing apparatus according to claim 12, wherein
the processor includes a plurality of cores, and
the first time interval is determined based on a processing capacity of the plurality of cores.

17. The information processing apparatus according to claim 12, wherein the processor includes a plurality of cores,
a number of cores used for execution is selected based on a comparison of an execution queue length of threads to a predetermined core execution length.

* * * * *